United States Patent Office 3,543,496
Patented Dec. 1, 1970

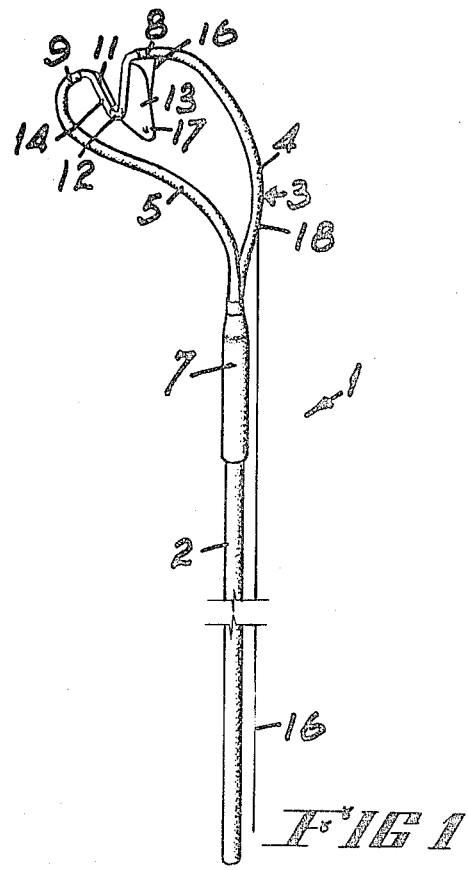
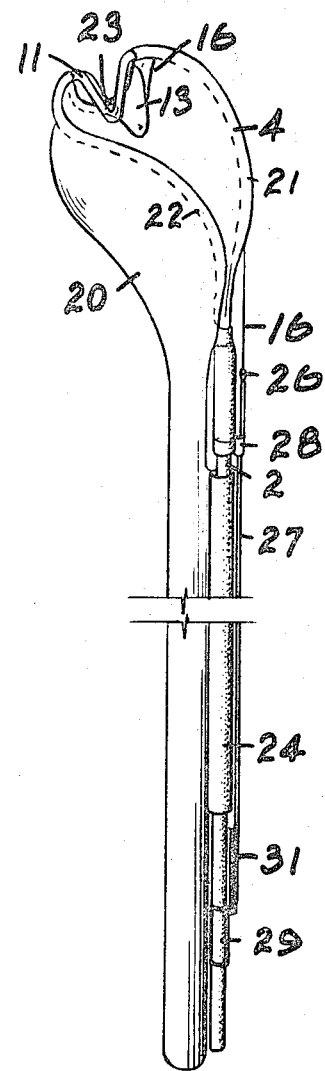
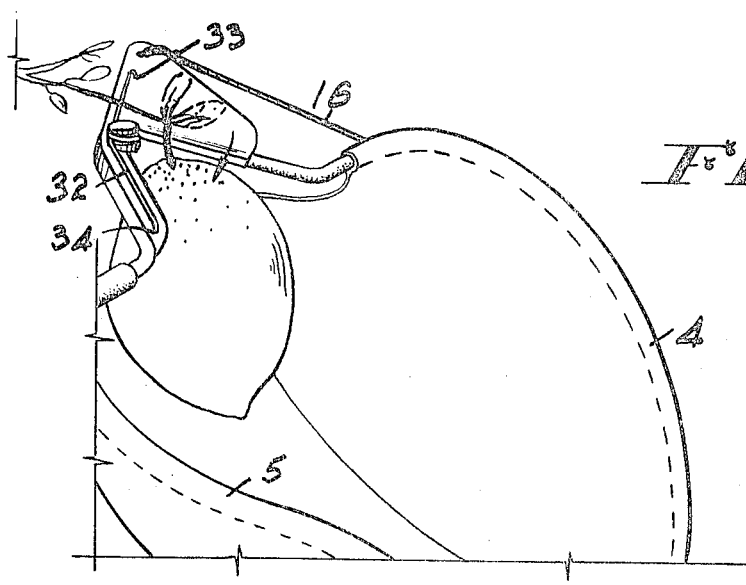

3,543,496
FRUIT PICKING DEVICE
Howard H. Foale, 59 Victoria St., Forestville,
South Australia, Australia
Filed Nov. 8, 1967, Ser. No. 681,366
Claims priority, application Australia, Nov. 14, 1966,
13,865/66
Int. Cl. A01g *19/08*
U.S. Cl. 56—336     5 Claims

ABSTRACT OF THE DISCLOSURE

A fruit picking device which has a pivoted fruit engaging member by which fruit can be caught and pulled from their stems, the pivotal arrangement enabling this to be done without damage to the selected fruit or adjacent fruit in a bunch.

---

This invention relates to a fruit picking device.

The manual picking of fruit is achieved by a picker climbing a ladder or being supported on a platform of some type from which platform or ladder he then can manually reach out and pick the fruit as necessary and selected by him.

Quite obviously the problems with such an arrangement are that each time the picker wishes to shift his position, he must climb down from the ladder or platform, move the whole of this assembly to a further part of the tree, urge it either into the tree or close to the tree, climb up to the top of the platform and start picking again.

Proposals have been made to pick fruit from the ground, but invariably these have not met with success as it has not been found possible to propose apparatus by which fruit as selected by the picker can be selected and picked from a bunch without accidently damaging adjacent pieces of fruit. Where the picking has to be of a very high grade or the fruit selected must be of uniform quality and must be unbruised, it has appeared that the only effective method of picking has been the manual worker, who must then go through the laborious procedure previously described.

I have discovered an apparatus by which a picker can reach and selectively pick selected fruit from a bunch, or in awkward parts of a tree, without either damaging the fruit itself or adjacent fruit pieces and associated with such a development, apparatus can be further added whereby there is negligible chance of the fruit being bruised after picking.

In a simple form the invention conceives a fruit picking device which includes a handle, a support loop secured to the handle, a fruit engaging member, and hinge means between the fruit engaging member and the support loop, the configuration of the fruit engaging member including an open portion of fruit engaging shape.

With such characteristics it is found that the fruit engaging member can be urged up between adjacent fruit, and by being hingedly secured to the support loop will conform generally to the planar relationship existing between the adjacent fruit, but once over the selected piece of fruit, by the picker pulling on the device, the fruit engaging member will engage the fruit normally in a manner not bruising the top of this, and urge this away from the stem. The fruit engaging member, by being thus secured will again conform to the general planar contact area of the upper face of the fruit, and thereby distribute any pull offered by the operation of the device and in this way substantial damage to the fruit is considerably reduced.

With further modifications and development, it has been found useful to support this engaging member by a support loop and it is also useful to support a chute to extend from immediately beneath the loop so that fruit once picked can either be gathered in this and this will gently lower the fruit into some container.

Several embodiments of the invention will now be described with reference to drawings in which:

FIG. 1 is a first embodiment,

FIG. 2 is this same first embodiment with a chute attached and a preferred method of operating the cutter, FIG. 3 is an enlarged perspective view of the apparatus in the act of taking a lemon from a tree.

Figure 4:
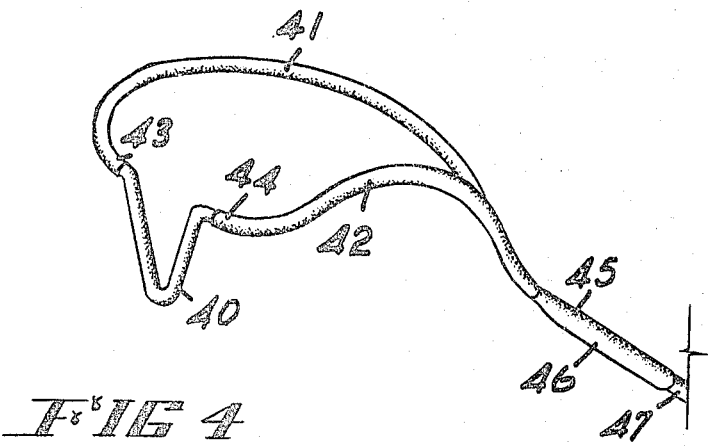
FIG. 4 is a second embodiment in which there is not included a cutter and, FIG. 5 is the same second embodiment with a chute attached.

Referring initially to FIG. 1 the fruit picking device 1 includes a handle 2 at the end of which is attached a support loop 3 which comprises two wire side members 4 and 5 jointly secured to the handle 2 by a socket 7 and extending in a curved path to define a fruit encircling form, the wire members 4 and 5 extending to spaced points where the members 4 and 5 have ends 8 and 9 which define means adapted to pivotally support the splayed ends of a fruit engaging member 11 which is of generally V-shaped form which will thereby engage fruit, the sprayed ends of the fruit engaging member 11 fitting within hollow portions within the ends 8 and 9 of the wire members. Pivotally secured at the apex 12 of the fruit engaging member 11 is a blade 13 which is arranged to cut across the area of the fruit engaging member 11 to effectively make a scissor action with side 14 of the fruit engaging member 11. This action of blade 13 is initiated upon the pulling of flexible cord 16 which is secured to the blade 13 at attachment point 17, the cord 16 entering an aperture in the wall of the wire member 4 and extends through the hollow form of the wire member exiting through an aperture at 18 again in the wall of the wire member 4 and extending downwardly to be accessible close to the handle 2.

Referring to FIG. 2 a fabric chute 20 is secured to the wire members 4 and 5 by a seam 21 and 22 sewn in the top of the chute 20 and at the end of the chute, to allow the fruit engaging member 11 to be freely hinged is an open area 23, whereby this may be accomplished. The chute 20 extends down past the handle 2 and is secured thereto by a seam 24, the chute extending down past the handle to preferably a container (which is not shown).

The flexible cord 16 is secured to the handle 2 by being affixed at 26 to rod 27 which passes through guide 28 and thereafter to tubular operating member 29 which is held in a position which assists in holding the blade 13 open by coil spring 31 which is secured between the member 29 and the handle 2.

With reference to FIG. 3 more detail is shown of the fruit engaging member 11 and the attachment blade 13 to this fruit engaging member 11. The blade 13 includes resilient spring member 32 which extends between the fruit engaging member 11 and the blade 13, the spring passing through and locating with the blade at aperture 33 and similarly passing through and engaging with the fruit engaging member at aperture 34.

Referring to FIG. 4 a second embodiment is shown in which fruit engaging member 40 does not include any cutting means but is simply pivotally secured to wire side members 41 and 42 by having splayed ends passing into appropriate apertures at the free ends 43 and 44 of these wire members 41 and 42. Again the free engaging member is of a generally V-shaped form which is found to be the most useful for engaging and thereby for picking fruit. The wire members 41 and 42 have a shape which extends from a common joining point at 45 where they are joined together in a socket 46 which is thereafter secured to a handle 47, the wire members 41 and 42 when extending outwardly to effect a general tear shape in plan. From a side they have the curved form giving in the whole a somewhat striking adder-like appearance.

Figure 5:
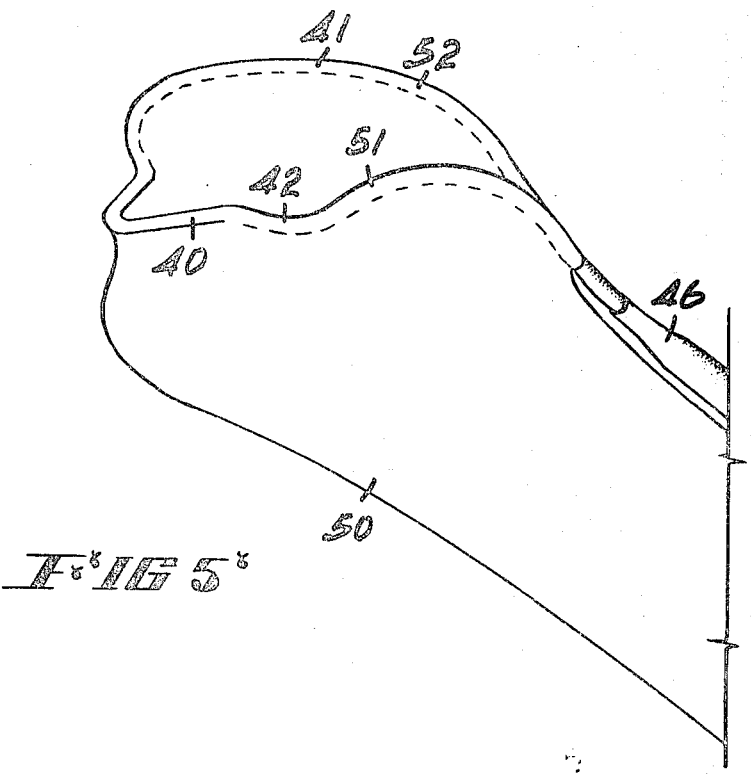

FIG. 5 shows the same embodiment as FIG. 4 except that a chute 50 is attached by seams 51 and 52 extending around the wire side members 41 and 42, in this case the seams extending fully around the fruit engaging member 40.

Having now described the preferred embodiments the method of use will be apparent, in that in either case for either embodiment, the device is made so that it can be attached to a very long handle and by having the pivotally secured fruit engaging member which will conform to any planar relationship existing between adjacent fruit, it will thereby not unduly disturb the lay of the fruit, and it can, therefore, be passed up between adjacent pieces of fruit without unnecessarily damaging or knocking these off, and the fruit engaging member can then be brought around to bear directly against the fruit and pull this from its stem.

In this description I understand the term "loop" to include any form which will allow the fruit free access to the fruit engaging member and the "loop" could be open to a side or depressed in form to allow this function.

While I have described the preferred embodiments there are slight modifications from these which for particular instances can be advantageous and for this purpose I would disclose that the fruit engaging member can include a fixed blade so arranged so that when pressure is borne against the stem of the fruit, this fixed blade will cut the stem and I would similarly disclose that instead of a pivotally secured fruit engaging member a piece of wire loosely held between the free ends of the wire members could be used, the wire form being such that it would reasonably conform to the dimension shown in the drawings when referred to the rigid fruit engaging member.

Such further modifications are suitable for certain types of fruit and the discretion of the picker would be needed as to which type is preferable for the occasion. Similarly, of course, the sides of the fruit engaging member must be adapted and the shape can be altered for particualr fruit or even a particular season having regard to the size of the fruit for that season.

What I claim is:

1. A fruit picking device comprising a handle, a support loop secured to the handle, said support loop having two side members, a fruit engaging member intermediate said side members and freely pivotally connected at each of its ends with respective side members, the configuration of the fruit engaging member defining a continuous central portion eccentric with respect to its ends such that it can be pivoted by slight engagement with said fruit or stem thereof and including an open portion for engaging and picking said fruit or stem thereof.

2. A fruit picking device as defined in claim 1 wherein cutter means are secured to the fruit engaging member.

3. A fruit picking device as defined in either claim 1 in which a chute is secured to the support loop and extends downwardly therefrom.

4. A fruit picking device as defined in claim 1 wherein said central portion of said fruit engaging member has a generally V-shaped configuration including an apex portion and said device further includes a cutter blade pivotally mounted on said apex portion of the fruit engaging member, flexible means secured to the blade so as to be able to pivot said blade about its mounting on said apex portion to a cutting position against one side of said fruit engaging member regardless of the plane of said fruit engaging member and extending to the handle, and resilient spring means affixed to the blade and to the fruit engaging member and extending therebetween for returning said blade to its open position when said flexible means is released.

5. A fruit picking device comprising a handle, a support loop secured to the handle, the support loop comprising two side members extending to spaced points where said side members each have an end, a fruit engaging member pivotally supported between the ends of each said side member, the configuration of the fruit engaging member including a generally V-shaped continuous central portion having an apex portion eccentric with respect to ends of the fruit engaging member such that it can be pivoted by slight engagement with said fruit or stem thereof and an open portion for engaging said fruit or stem, a chute secured to the support loop and extending downwardly therefrom, a cutter blade pivotally mounted on said apex portion of the fruit engaging member, flexible means secured to the blade so as to be able to pivot the blade about its mounting on said apex portion to a cutting position against one side of said fruit engaging member regardless of the plane of said fruit engaging member and extending to the handle, and resilient spring means affixed to the blade and to the fruit engaging member and extending therebetween for returning said blade to its open position when said flexible means is released.

References Cited

UNITED STATES PATENTS

| | | | |
|---|---|---|---|
| 371,951 | 10/1887 | Kuehn | 56—334 |
| 427,112 | 5/1890 | Reaves | 56—335 |
| 441,971 | 12/1890 | Potterf | 56—340 |
| 598,401 | 2/1898 | Terrill | 56—339 |
| 888,459 | 5/1908 | Belinski | 56—334 |
| 938,355 | 10/1909 | Virgin | 56—335 |
| 1,064,881 | 6/1913 | Ayer | 56—340 |
| 1,105,302 | 7/1914 | Pindell | 56—340 |
| 1,582,365 | 4/1926 | Wolken | 56—333 |
| 1,968,414 | 7/1934 | Melown | 56—334 |

RUSSELL R. KINSEY, Primary Examiner